J. B. BRADSHAW.
WHEEL RIM OR FELLY FOR PNEUMATIC OR SOLID TIRES.
APPLICATION FILED DEC. 10, 1906.

948,267.

Patented Feb. 1, 1910.
2 SHEETS—SHEET 1.

Witnesses

Inventor
Joseph B. Bradshaw

J. B. BRADSHAW.
WHEEL RIM OR FELLY FOR PNEUMATIC OR SOLID TIRES.
APPLICATION FILED DEC. 10, 1906.
948,267.
Patented Feb. 1, 1910.
2 SHEETS—SHEET 2.
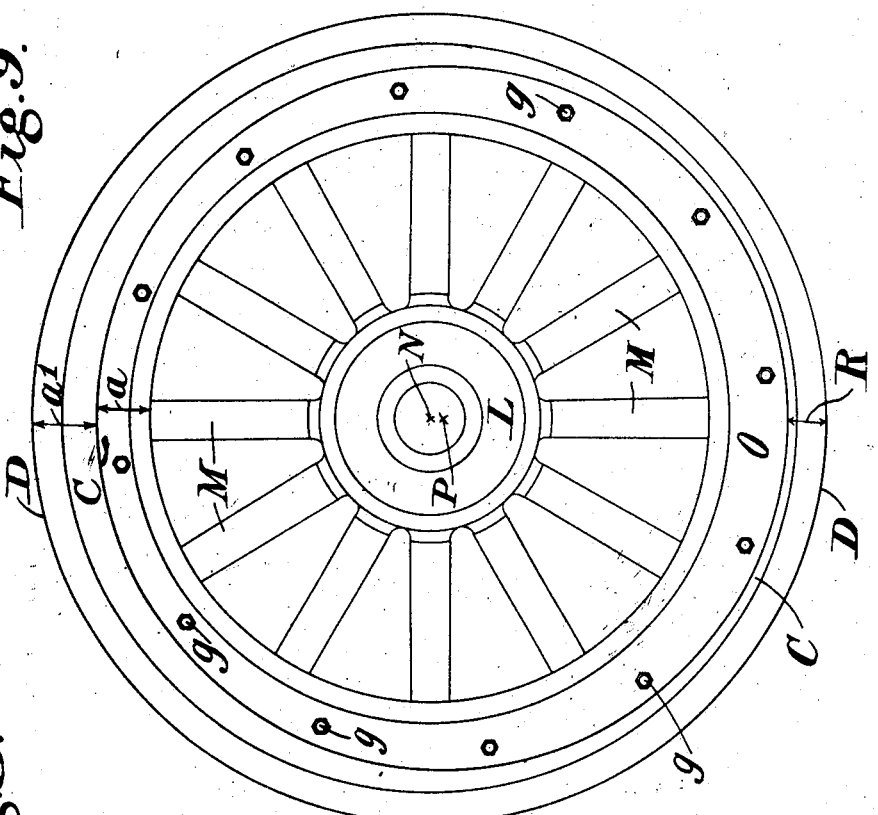
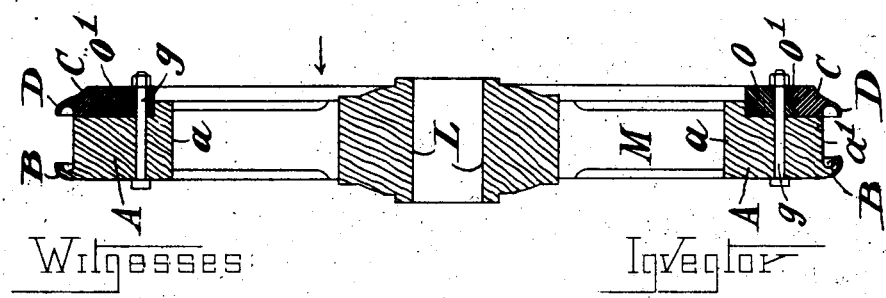
Witnesses
Inventor
Joseph Betts Bradshaw.
Attorneys.

UNITED STATES PATENT OFFICE.

JOSEPH BETTS BRADSHAW, OF MANCHESTER, ENGLAND.

WHEEL RIM OR FELLY FOR PNEUMATIC OR SOLID TIRES.

948,267.  Specification of Letters Patent.  Patented Feb. 1, 1910.

Application filed December 10, 1906. Serial No. 347,155.

*To all whom it may concern:*

Be it known that I, JOSEPH BETTS BRADSHAW, subject of the King of Great Britain, residing in Manchester, in the county of Lancaster, in the Kingdom of England, merchant, have invented certain new and useful Improvements in Wheel Rims or Fellies for Pneumatic or Solid Tires, for which application has been made in Great Britain, No. 20,906, dated September 20, 1906.

This invention relates to wheel rims or fellies for pneumatic tires, suitable for motor cars and other vehicles, and has for its object an arrangement whereby if a puncture takes place the outer cover and inner tube can be quickly withdrawn, repaired and the tire again placed in position and inflated.

The invention can also be applied to solid tires.

Figure 4:
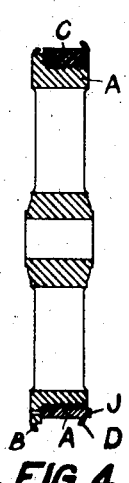
Figure 5:
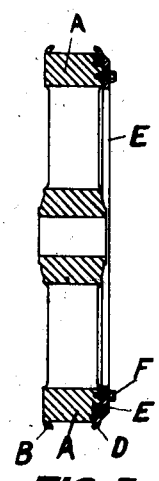
Figure 6:
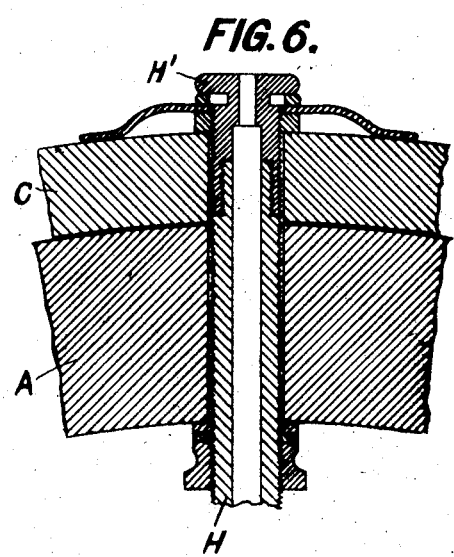
Figure 7:
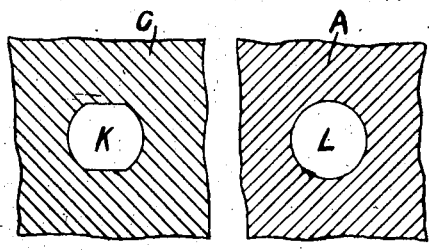

In the accompanying drawings:—Figures 1, 2, 3, 4 and 5 are vertical cross sections of wheels with my invention applied thereto. Fig. 6, is a sectional view on a larger scale of the valve. Fig. 7 shows the shape of holes in the rim and ring for the valve tube. Fig. 8 is a vertical section; and Fig. 9 a front elevation of a wooden wheel with my invention applied thereto.

Figure 1:
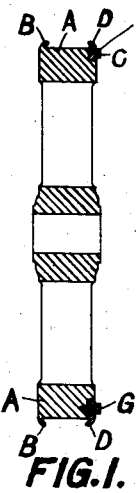
Figure 2:
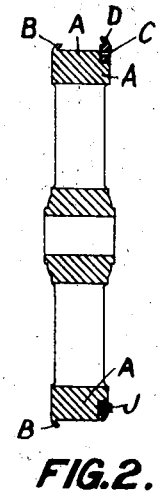

Referring first to Figs. 1, 2, 8 and 9, L is the hub of the wheel, M the spokes, and A the rim. The rim has its inner surface $a$ and its outer surface $a^1$ concentric with the axis N, and it is made at one side with a flange B either in one with the rim, as shown in Figs. 1 and 2, or shrunk on to the rim in the case of a wooden wheel, shown in Figs. 8 and 9. At the other side the rim has a groove or recess in it. This is formed in the case of Figs. 8 and 9 by applying an annular flange O bolted to the rim A by bolts $g$, and in the case of Figs. 1 and 2 by cutting a groove in the rim. In this groove is placed a retaining ring C provided with a flange D at its periphery. The ring C is held in said annular groove or recess by screwing it thereon. The ring C and groove are made in a peculiar manner, that is to say the groove is a circle struck from the point P as a center, which point is eccentric to the wheel axis N. The inner periphery of the ring C is also bored out from the same center P, so that the ring C, when rotated in its groove, will have an eccentric movement, and can be rotated into position with its flange D concentric with the rim. If rotated into the position shown in Figs. 1, 8 and 9, the ring flange D is in its working position, that is concentric with the rim and confining the pneumatic tire, or if rotated half a turn into the position shown in Fig. 2, its flange becomes eccentric with the wheel and lies flush at one part with the periphery of the rim, thus enabling the pneumatic tire to be removed. The flanges B—D in the drawings are so formed that one edge of the outer cover fits into an embayment in the flange B fixed to the rim, and the edge at the other side fits into an embayment in the flange D of the ring. The edges of the outer cover are forced against the flanges by the pressure inside the air tube, and the outer cover will be thoroughly locked when the tire is inflated.

The invention can be applied to almost any shape of pneumatic tires, the flanges being formed of the required shape to receive the edges of the outer cover. The outer surface $a^1$ is preferably entirely flat except at the opposite edges, or if desired it can be concave or otherwise shaped at the central portion.

The mode of action is as follows:—The ring C being turned into one position, will have its flange D truly concentric with the flange B at the opposite side of the rim A, Figs. 1, 8 and 9, and in this position, holds the eccentric bored ring C concentric with the rim of the wheel, with the tire between the flanges B and D. If, however, it be turned say half a turn, the flange D at one part will lie flush with, or below the periphery of the rim A, and the eccentric movement will have brought the thinnest part R of the ring to the opposite side, (Fig. 2,) thus causing the flange D to be brought wholly out of the way at one part, and partly out of the way for a considerable portion of the surface of the wheel. The removal of the tire is then completed by sliding it off at that part, and it falls or comes off at the opposite part. A new tire can then be put on, and the flange D being flush with the periphery of the ring at one side, facilitates it being placed in position. When the tire is in place, the annular ring is rotated so as to bring its flange D concentric with the flange B of the rim. The tire is then inflated in the usual manner, and the edges of the outer cover pressed sidewise against the inner faces of the two flanges. Thus the edges of the outer cover are forced by the inflation against the flanges and locked in position. After the ring C has been turned so that its flange D is concentric with the flange B on the rim, the procedure in inflating the tire is the same as at the present time, and the result the same, as the edges of the outer cover pressing against the flanges, lock the tire in place. To remove the tire cover, all that is necessary is to deflate the air tube, press the edges of the outer cover away from the flanges, and then give the ring half a turn, and the tire can then be taken off. The amount of eccentricity of the ring is approximately equal to the depth of the flange.

The bore of the ring C is screw-threaded, and the recess or shoulder $O^1$ provided with similar threads, so that the ring C can be screwed thereon, and then held with its flange concentric with the flange on the rim, by means of a set pin G or other suitable appliance. The screw threads formed on the internal periphery of the rings and the threads formed on the rim are cut so as to allow the rings to screw upon the rim in an opposite direction to that which the wheel is intended to travel so that the revolving of the wheel forward will tend to automatically tighten the ring upon the rim by the action of the rotation of the wheel.

J is a projecting lug for the purpose of starting the ring to unscrew, so that if a sharp blow be given to this lug by a hammer, should the ring happen to stick, it will start the unscrewing of the ring.

Figure 3:
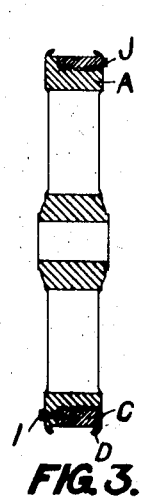

In thus describing the invention, I wish it to be understood that I do not confine myself to the exact details hereinbefore described. Thus for example the ring C could be made if desired nearly the full width of the rim and the recess in the rim A made to correspond, as shown in Figs. 3 and 4, or the ring C can be freely mounted in the recess as shown in Fig. 5 and held locked in the recess by means of an annular collar E fastened on by set pins F. The letters of reference in all the figures, refer to like parts. It will, of course, be understood that in Figs. 3 and 4 the tire will be removed over the fixed flange, as shown in the upper part of Fig. 4, and, of course, the inflating valve if a pneumatic tire is used, will have to be made in two parts, and united when holes in the flanged rim and the fixed rim are in alinement. Such holes would be placed so as to be in alinement, when the two flanges were concentric.

The invention can be equally well applied for use in connection with solid rubber tires; in which case the construction is practically the same.

Fig. 6 is a sectional view through rim A and the ring C showing the valve tube H also in section. This valve tube H is made in two parts H and $H^1$ and the part H screws into the part $H^1$. When it is desired to remove the tire, this part H is unscrewed and taken out, which leaves the part $H^1$ in the hole in the ring C (and attached to the pneumatic tube) free to rotate with the ring C to half a turn.

K (Fig. 7) shows the shape of the hole for the valve tube in the outer ring to prevent the valve turning around, L the round hole in the rim.

I declare that what I claim is:—

In a wheel, a rim having a flange upon one side thereof, an annular groove formed in the opposite side of the rim eccentric to the axis of the wheel, threads formed at the bottom of the groove, and a retaining ring mounted in the groove and engaging the threads thereof.

In witness whereof, I have hereunto signed my name this 22nd day of November, 1906, in the presence of two subscribing witnesses.

JOSEPH BETTS BRADSHAW.

Witnesses:
ERNOLD SIMPSON MOSELEY,
MALCOLM SMETHURST.